United States Patent [19]

Müller-Albrecht et al.

[11] 3,970,717

[45] July 20, 1976

[54] SATURATED HYDROXY POLYESTER URETHANES AND STYRENE COPOLYMERS

[75] Inventors: Horst Müller-Albrecht, Cologne; Bernd Quiring, Leverkusen; Manfred Dollhausen, Hitdorf; Jochen Wulff, Benrath, all of Germany

[73] Assignee: Bayer Aktiengesellschaft, Leverkusen, Germany

[22] Filed: Nov. 11, 1974

[21] Appl. No.: 522,399

[30] Foreign Application Priority Data
Nov. 9, 1973  Germany............................ 2355942

[52] U.S. Cl.................... 260/859 R; 260/2.5 BE; 260/18 EP; 260/18 N; 260/31.8 M; 260/37 N; 260/40 TN; 260/77.5 CR; 260/859 PV

[51] Int. Cl.²....................................... C08L 75/00
[58] Field of Search.................. 260/859 R, 77.5 LR

[56] References Cited
UNITED STATES PATENTS

| | | | |
|---|---|---|---|
| 3,358,052 | 12/1967 | Archer............................ | 260/859 R |
| 3,368,988 | 2/1968 | Sekmakas....................... | 260/859 R |
| 3,385,909 | 5/1968 | Haag............................... | 260/859 R |
| 3,457,324 | 7/1969 | Sekmakas....................... | 260/859 R |
| 3,597,495 | 8/1971 | Sekmakas....................... | 260/859 R |

*Primary Examiner*—Paul Lieberman
*Attorney, Agent, or Firm*—Joseph C. Gil; Gene Harsh

[57] ABSTRACT

The instant invention relates to compositions comprising certain copolymers and/or graft polymers of styrene or α-methyl styrene in combination with certain polyurethanes useful as adhesives.

5 Claims, No Drawings

SATURATED HYDROXY POLYESTER URETHANES AND STYRENE COPOLYMERS

BACKGROUND OF THE INVENTION

It is known that adhesives suitable for bonding a wide variety of materials such as leather, synthetic leather, rubber or plastics can be prepared from high-molecular weight hydroxy-polyurethanes. Adhesives of this kind have been described, inter alia, in German Pat. No. 1,256,822.

If such adhesives are applied without heating ("cold sealing process"), a sufficiently strong bond, especially immediately after glueing ("instant strength"), is obtained only if bonding is carried out within a certain interval of time ("open time"). For the majority of adhesives applied in this way, this "open time" is extremely brief, i.e. only a few minutes. Faulty bonds are obtained not only if the open time is exceeded but also if a shorter time is used. In order to avoid this, the adhesives are applied by a thermal activating process in which the layers of adhesive are heated to about 80°C (i.e. activated), e.g., by infrared irradiation, before they are joined together. This thermal activation process, however, cannot always be applied. It firstly requires considerable expenditure relative to the apparatus to be used. Moreover, many materials, e.g. plastic sheets, are subject to deformation or damage by such treatment.

Investigations have been carried out with the object of overcoming these serious disadvantages by increasing the "open time" of hydroxy-polyurethane adhesives by means of addition of various kinds of resins. The adhesives with longer "open times" obtained in this way, however, gave rise to bonds which were not strong enough for many purposes, particularly immediately after bonding ("instant strength"). Furthermore, the addition of resins also reduced the adherence of the adhesives to many materials and substantially reduced the resistance of the bonds to plasticizers.

DESCRIPTION OF THE INVENTION

It has now surprisingly been found that adhesives which have very long "open times" and which produce bonds which combine previously unattained "instant strength" with rapid setting can be prepared from certain high-molecular weight hydroxy polyurethanes and styrene copolymers. The resistance of the bonds to plasticizers is excellent. Moreover, bonds produced using the adhesives according to the instant invention have greater resistance to moist, hot atmospheres. In addition, the layers of adhesive undergo substantially less yellowing when they are exposed to light, e.g. in transparent composite foils.

This invention, therefore, relates to compositions suitable for use as adhesives comprising;
 a. an hydroxy polyester urethane having a molecular weight above about 30,000 and
 b. a polymer selected from the group consisting of (1) copolymers of styrene and/or α-methyl styrene with at least one other olefinically unsaturated monomer and (2) mixtures of (1) with rubbery elastic polymers.

The invention also relates to compositions particularly suitable for this use, comprising;
 A. a hydroxy polyesterurethane having a molecular weight above 30,000 derived from
  1. a polyester with a molecular weight above about 600 selected from the group consisting of
   a. adipic acid and butane-1,4-diol and/or hexane-1,6-diol polyesters,
   b. ε-polycaprolactone and,
   c. dihydroxy polyhexamethylene carbonate;
  2. from 0 to 400 mol percent, based on the polyester (1), of a diol chain-lengthening agent having a molecular weight of between about 62 and about 300, and,
  3. an organic polyisocyanate; and
 B. a polymer selected from the group consisting of;
  1. a thermoplastic copolymer of styrene and/or α-methyl styrene with acrylonitrile, said copolymer containing from about 40 to about 80 percent by weight of styrene and/or α-methyl styrene and
  2. a mixture of
   a. from about 5 to about 60 percent by weight of a graft polymer obtained by grafting an acrylonitrile/styrene and/or acrylonitrile/α-methyl styrene mixture on polybutadiene, and which contains from about 30 to about 70 percent by weight of butadiene units from about 5 to about 20 percent by weight of acrylonitrile units and from about 25 to about 50 percent by weight of styrene and/or α-methyl styrene units and
   b. from about 95 to about 40 percent by weight of the copolymer mentioned under (1)
the weight ratio of A:B preferably being between 1:0.05 and 1:3.

Component A of the compositions according to the instant invention consists of substantially linear hydroxy polyester urethanes which have molecular weights determined by the scattered light method of more than 30,000 and preferably between 50,000 and 1,000,000. Preparation of such hydroxy polyester urethanes is carried out in known manner by reacting dihydroxy polyesters which have a molecular weight above 600 and preferably between 2000 and 4000 with subequivalent quantities of polyisocyanate, to which low-molecular weight difunctional chain-lengthening agents may be added.

Suitable dihydroxy polyesters are, in particular, those derived from saturated dicarboxylic acids which preferably contain at least 6 carbon atoms and saturated diols which preferably contain at least 4 carbon atoms. Suitable dicarboxylic acids are, for example, adipic acid, pimelic acid, suberic acid, azelaic acid, sebacic acid and the like. Suitable diols are, for example, butane-1,4-diol, pentane-1,5-diol, hexane-1,6-diol, and the like. Apart from such polyesters, hydroxy polycarbonates, in particular those of hexane-1,6-diol and diaryl carbonates, as well as esterification products of straight chain hydroxy alkane monocarboxylic acids which contain at least 5 carbon atoms or the corresponding lactone polymers may also be used.

Hydroxy polyesters of adipic acid and butane-1,4-diol and of adipic acid and hexane-1,6-diol and hydroxy polyesters of ε-caprolactone and hexane-1,6-diol polycarbonates with hydroxyl end groups are presently preferred. The polyesters used preferably have molecular weights of 2000 to 4000.

Essentially any organic polyisocyanate may be used. However, it is preferred to use aliphatic, cycloaliphatic, araliphatic and aromatic diisocyanates, e.g. butane-1,4-diisocyanate, hexane-1,6-diisocyanate, cyclohexane- 1,4-diisocyanate, 1-methyl-2,4-diisocyanatocyclohexane, 1-methyl-2,6-diisocyanato-cyclohexane, 1-isocyanato-3-isocyanatomethyl-3,5,5-trimethylcyclohexane, 2,4- and -2,6-diisocyanatotoluene, 4,4'-diphenylmethane-diisocyanate, 4,4-diphenylpropane-diisocyanate or mixtures of such diisocyanates, 4,4'-diphenylmethane diisocyanate and 2,4- and -2,6-diisocyanatotoluene and mixtures thereof.

Suitable chain-lengthening agents, which are optional, are in particular, diols having a molecular weight of between about 62 and about 300 e.g. esterdiols, such as terephthalic acid-bis-2-hydroxyethylester, or etherdiols, such as hydroquinone-bis-2-hydroxyethylether, but aliphatic diols such as ethylene glycol, propane-1,3-diol, butane-1,4-diol, pentane-1,5-diol, hexane-1,6-diol and the like are generally preferred.

The diols may also be used as mixtures. The total quantities in which they are used are from 0 to 400 mol percent preferably from 0 to 200 mol percent, based on the hydroxy polyester.

Component B of the compositions according to the instant invention are preferably a. thermoplastic copolymers of styrene and/or α-methyl styrene with at least one other olefinically unsaturated monomer, which copolymers have a softening point about 70°C determined according to DIN 53,460 and contain 60–20 percent by weight of units corresponding to other olefinically unsaturated monomers in addition to 40–80 percent by weight of styrene and/or α-methyl styrene units, or b. mixtures of copolymers (a) with rubbery elastic polymers, the said mixtures preferably containing components (a) and rubbery elastic polymers in proportions by weight of between 40:60 and 95:5.

The thermoplastic copolymers (a) are copolymers of styrene and/or α-methyl styrene with at least one other olefinically unsaturated monomer such as acrylonitrile, methacrylonitrile, methylacrylate or methyl methacrylate. Component (a) is preferably a copolymer of styrene and/or α-methyl styrene, and acrylonitrile.

Component (b) which may, if desired, be used instead of the pure component (a) consists of mixtures of component (a) with rubbery elastic polymers which have a freezing temperature of below 20°C determined according to DIN 53,513. Suitable examples are, in particular, graft polymers obtained by grafting a styrene/acrylonitrile and/or an α-methyl styrene/acrylonitrile mixture on polybutadiene, for example, in accordance with U.S. Pat. No. 2,820,773. Particularly suitable graft polymers contain from about 30 to about 70 percent by weight of butadiene units, from about 5 to about 20 percent by weight of acrylonitrile units and from about 25 to about 50 percent by weight of styrene and/or α-methyl styrene units.

Instead of the above-mentioned graft polymers, however, there may, of course, be used graft polymers in which the butadiene has been partly or completely replaced by isoprene or the acrylonitrile has been partly or completely replaced by methacrylonitrile and/or $C_1$–$C_{18}$ alkyl esters of acrylic or methacrylic acid. As recognized in the art, the graft polymers may be prepared by solution, suspension, precipitation or mass polymerization processes. One particularly suitable process for preparing graft polymers of the type presently contemplated has been described in U.S. Pat. No. 2,820,773.

Component (b), may in principle, contain any other rubbery elastic polymer with a freezing temperature of below 20°C (DIN 53,513) instead of the above-mentioned preferred graft polymers. Suitable rubbery elastic polymers are, for example, rubbery elastic polyacrylic acid esters, EPDM rubbers and polyalkenamer rubbers. These rubbery elastic polymers used for rubber modification of component (a) may be prepared in known manners by solution of emulsion processes.

Rubber modification of the thermoplastic copolymer (a) may be carried out by mixing the copolymer with the rubbery elastic polymer and thermoplastic copolymer in a manner similar to Example IV of U.S. Pat. No. 2,820,773.

Component B may also consist exclusively of graft polymers of the type described.

In the compositions according to the instant invention, components A and B are preferably present in weight ratios of between 1:0.05 and 1:3 and preferably between 1:0.2 and 1:1.5.

These compositions are preferably prepared by mixing the components preferably under conditions of homogenization on rollers, extruder screws or other suitable machines.

The resulting compositions yield viscous adhesives when mixed with solvents such as ethyl acetate, acetone or methyl ethyl ketone. These adhesives may also be prepared by stirring the component (B) into a hydroxy polyester polyurethane solution. The compositions are generally used as 10% to 40% solutions. As recognized in the art, the adhesives may be modified e.g. by adding polyisocyanates, catalysts, natural or synthetic resins, organic acids, fillers and the like.

The adhesives are used by applying them to the surfaces which are to be bonded together, if necessary, after first rubbing down the surfaces to roughen them or preparing them in some other manner. The adhesives may be applied by rollers, brushes, spatulas, spray guns or some other device. The adhesive when applied is left to dry and the materials coated with the adhesive are then pressed together within the "open time".

The adhesives according to the invention can be used for obtaining firm bonds with various materials such as paper, cardboard, wood, metal, or leather. They are preferably used for bonding rubber materials and in particular, synthetic resins including polyurethane foams which have a compact surface plasticizer-containing homopolymers or copolymers of vinyl chloride, and above all, for bonding shoe soles made of these materials to shoe uppers made of leather or synthetic leather.

EXAMPLES

The adhesives were prepared by stirring the compositions according to the invention into methyl ethyl ketone.

Table 1 shows the compositions of the binders used.

Table 2 shows the compositions of the polyurethanes used.

Table 3 shows the compositions of the polymers.

Bonds were produced with the adhesives. The following materials were bonded:

a. A commercial rubber material, 4 mm thick, made of acrylonitrile butadiene rubber (acrylonitrile content 33%, Defo hardness 700 according to DIN 53,514) which contained about 31% of silicate filler (Shore hardness A of rubber material 85 according to DIN 53,505) and b. A PVC material, 4 mm thick, made of 70 parts by weight of polyvinyl chloride (K-value 80), 30 parts by weight of dioctyl phthalate as plasticizer and 5 parts by weight of epoxydized soya-bean oil and 1.2 parts by weight of barium-cadmium laurate.

Before the adhesives were applied, the surfaces of sample strips of materials 15 cm in length and 3 cm in width which were to be bonded were thoroughly rubbed down with a grade 40 sanding belt. The materials were freed from sanding dust and coated with the individual adhesives and then kept open at room temperature and joined together after the times indicated in Table 4 and pressed together for 15 seconds under a pressure of 3 kg/cm². The resistance to separation was tested according to DIN 53,274 immediately after the materials had been bonded and 1 day and 9 days later. The resistance to separation are also shown in Table 4.

Table 1

| Adhesive* | Polyurethane A | Polymer B | A : B |
|---|---|---|---|
| 1 (comparison) | I | — | 1 : 0 |
| 2 | I | I | 1 : 1 |
| 3 | I | II | 1 : 0.5 |
| 4 | I | II | 1 : 1 |
| 5 | I | III | 1 : 1 |
| 6* (comparison) | I | — | 1 : 0 |
| 7* | I | II | 1 : 1 |
| 8 (comparison) | II | — | 1 : 0 |
| 9 | II | II | 1 : 0.5 |
| 10 (comparison) | III | — | 1 : 0 |
| 11 | III | II | 1 : 1 |
| 12 | I | IV | 1 : 1 |

*10% of a 20% solution of 4,4',4''-triisocyanato-triphenylmethane in methylene chloride were added to the 20% adhesive.

TABLE 2

| Polyurethane | Polyester | | Polyisocyanate | | Chain-lengthening agent |
|---|---|---|---|---|---|
| I | 1000 g | of adipic acid/butane-1,4-diol polyester with OH-number 52.4 | 81.2 g | of isomeric mixture (80:20) of 2,4- and 2,6-diisocyanato-toluene | — |
| II | 1000 g | of adipic acid/butane-1,4-diol polyester with OH-number 52.4 | 163.5 g | of 4,4'-diisocyanato-diphenyl-methane | 16.8 g of butane 1,4-diol |
| II | 1000 g | of poly-ε-caprolactone with OH-number 37.9 | 58.6 g | of isomeric mixture (80:20) of 2,4- and -2,6-diisocyanato-toluene | |

Table 3

| Polymer* | Copolymer (a) of | | Graft polymer (b) of | | | Ratio of (a) : (b) |
|---|---|---|---|---|---|---|
| | styrene (% by weight) | acrylonitrile (% by weight) | styrene (% by weight) | acrylonitrile (% by weight) | butadiene (% by weight) | |
| I | 72 | 28 | — | — | — | — |
| II | 72 | 28 | 36 | 14 | 50 | 3 : 1 |
| III | 72 | 28 | 36 | 14 | 50 | 65 : 35 |
| IV | — | — | 36 | 14 | 50 | — |

*Polymer I is a pure polymer while polymers II and III are mixtures of this copolymer with the given graft polymer. The copolymer was prepared by emulsion polymerization. Mixtures II and III were prepared in a manner similar to Example IV of U.S. Patent Specification No. 2,820,773. Graft polymer IV was also prepared in a manner similar to the method described in U.S. Patent Specification No. 2,820,773.

Table 4

| Adhesive | Bonds joined together after minutes | Resistance to separation (kp/cm) | | | | | |
|---|---|---|---|---|---|---|---|
| | | Rubber immediately | Rubber 1 day | 9 days | Soft PVC immediately | Soft PVC 1 day | 9 days |
| 1 (comparison) | 15 | <0.1 | <0.1 | <0.1 | <0.1 | <0.1 | <0.1 |
| 2 | 240 | 0.9 | 3.1 | 3.6 | 1.1 | 4.6 | 5.9 |
| 3 | 120 | 1.1 | 2.9 | 3.7 | 1.3 | 4.6 | 7.0 |
| 4 | 240 | 1.6 | 2.7 | 3.6 | 1.3 | 4.7 | 7.1 |
| 5 | 240 | 0.8 | 3.3 | 3.5 | 0.8 | 5.2 | 6.2 |
| 6* (comparison) | 15 | <0.1 | <0.1 | <0.1 | <0.1 | <0.1 | <0.1 |
| 7* | 120 | 0.8 | 3.2 | 3.8 | 0.9 | 5.3 | 9.5 |
| 8 (comparison) | 15 | <0.1 | <0.1 | <0.1 | <0.1 | <0.1 | <0.1 |
| 9 | 120 | 0.5 | 2.7 | 3.3 | 0.5 | 4.3 | 5.2 |
| 10 (comparison) | 60 | <0.1 | <0.1 | <0.1 | <0.1 | <0.1 | <0.1 |
| 11 | 120 | 0.4 | 2.9 | 3.5 | 0.5 | 3.2 | 5.3 |
| 12 | 120 | 0.5 | 2.2 | 2.8 | 0.5 | 2.8 | 3.6 |

What is claimed is:

1. A composition of matter comprising:
   A. an hydroxy polyester urethane having a molecular weight above about 30,000, said urethane derived from 1. a saturated polyester with a molecular weight above about 600,
2. from 0 to 400 mol percent based on polyester (1) of a diol chain-lengthening agent having a molecular weight of between about 62 and about 300, and
3. an organic polyisocyanate, and B. a polymer selected from the group consisting of
   i. copolymers of styrene and/or α-methyl styrene with at least one other olefinically unsaturated monomer, and
   ii. mixtures of (i) with a rubbery elastic polymer, wherein the weight ratio of component (A) to component (B) is between 1:0.5 and 1:3.

2. The composition of claim 1, wherein said rubbery elastic polymer is a graft polymer of styrene and/or α-methyl styrene.

3. The composition of claim 1, wherein said polymer (B) is selected from the group consisting of:
   1. a thermoplastic copolymer of styrene and/or α-methyl styrene with acrylonitrile, said copolymer containing from about 40 to about 80 percent by weight of styrene and/or α-methyl styrene; and
   2. a mixture of
      a. from about 5 to about 60 percent by weight of a graft polymer obtained by grafting an acrylonitrile/styrene and/or acrylonitrile/α-methyl styrene or polybutadiene, said graft polymer containing from about 30 to about 70 percent by weight of butadiene units, from about 5 to about 20 percent by weight of acrylonitrile units, and from about 25 to about 50 percent by weight of styrene and/or α-methyl styrene units and,
      b. from about 95 to about 40 percent by weight of said copolymer (1).

4. The composition of claim 2, wherein said polyester (1) is selected from the group consisting of:
   A. adipic acid and butane-1,4-diol and/or hexane-1,6-diol polyesters,
   B. ε-polycaprolactone; and
   C. dihydroxy polyhexamethylene carbonate; and wherein said organic polyisocyanate is an organic diisocyanate.

5. An adhesive composition which contains as binder the composition of matter of claim 1.

* * * * *